United States Patent
Civitella

(10) Patent No.: US 11,846,516 B2
(45) Date of Patent: Dec. 19, 2023

(54) AUTOMATICALLY FACILITATING TRAVEL ROUTES BASED UPON TRAVEL SCENARIOS

(71) Applicant: TRANSFINDER CORPORATION, Schenectady, NY (US)

(72) Inventor: Antonio Civitella, Schenectady, NY (US)

(73) Assignee: TRANSFINDER CORPORATION, Schenectady, NY (US)

( * ) Notice: Subject to any disclaimer, the term of this patent is extended or adjusted under 35 U.S.C. 154(b) by 189 days.

(21) Appl. No.: 17/197,198

(22) Filed: Mar. 10, 2021

(65) Prior Publication Data

US 2021/0302181 A1   Sep. 30, 2021

Related U.S. Application Data

(60) Provisional application No. 63/000,765, filed on Mar. 27, 2020.

(51) Int. Cl.
*G01C 21/34* (2006.01)

(52) U.S. Cl.
CPC ..... *G01C 21/3461* (2013.01); *G01C 21/3415* (2013.01); *G01C 21/3484* (2013.01)

(58) Field of Classification Search
CPC ........... G01C 21/3461; G01C 21/3415; G01C 21/3484
See application file for complete search history.

(56) References Cited

U.S. PATENT DOCUMENTS

| | | | |
|---|---|---|---|
| 2003/0130789 A1* | 7/2003 | McDonough | G01C 21/34 |
| | | | 701/532 |
| 2006/0195257 A1 | 8/2006 | Nakamura | |
| 2010/0030464 A1 | 2/2010 | Mittermaier | |
| 2013/0110393 A1 | 5/2013 | Heed | |
| 2017/0010616 A1 | 1/2017 | Shashua et al. | |
| 2018/0143643 A1* | 5/2018 | Fairfield | G05D 1/0217 |
| 2018/0259347 A1 | 9/2018 | Khasis | |

(Continued)

OTHER PUBLICATIONS

International Search Report and Written Opinion of the International Searching Authority for International Application No. PCT/US2021/021617 dated May 19, 2021.

*Primary Examiner* — Anne Marie Antonucci
*Assistant Examiner* — Patrick M Brady
(74) *Attorney, Agent, or Firm* — HESLIN ROTHENBERG FARLEY AND MESITI PC; Nicholas Mesiti

(57) ABSTRACT

A method for facilitating a vehicle travel route includes accessing, via at least one electronic device, a geographic map stored in a memory. Travel regions, curb approach settings and maneuver settings are provided on the geographic map, the travel regions being designated as preferred, restricted or prohibited and the curb approach settings and the maneuver settings being designated as no preference, restricted or prohibited. A first set of one or more of the travel regions, the curb approach settings and the maneuver settings are associated to a first travel scenario. The travel regions, curb approach settings and maneuver settings associated with the first travel scenario are displayed on the geographic map on at least one electronic device. A processor generates a travel route based upon the first travel scenario. The at least one electronic device displays the travel route for the vehicle to travel.

23 Claims, 12 Drawing Sheets

(56) References Cited

U.S. PATENT DOCUMENTS

| | | | |
|---|---|---|---|
| 2020/0025583 A1* | 1/2020 | Herlocker | G08G 1/0133 |
| 2020/0318981 A1* | 10/2020 | Tyuryutikov | G01C 21/20 |
| 2021/0123753 A1* | 4/2021 | Liu | G01C 21/3446 |
| 2021/0191407 A1* | 6/2021 | Benisch | G05D 1/0219 |

* cited by examiner

FIG. 7 (Ref. 200)

FIG. 8 (Ref. 220)

FIG. 9 (Ref. 230)

| SYMBOL | DESCRIPTION | REF. NO. |
|---|---|---|
|  | PROCESSORS OR SERVERS | 302 |
|  | DATA OR INFORMATION SUCH AS AN ELECTRONIC MAP, TRAVEL SCENARIO, TRAVEL REGION, CURB APPROACH SETTING AND/OR MANEUVER SETTING | 304 |
|  | PROCESS OR ALGORITHM | 306 |
|  | CLOUD COMPUTING | 308 |
|  | END USERS OR OPERATORS | 310 |
|  | RESULTS SUCH AS A TRAVEL ROUTE FOR A VEHICLE | 312 |
|  | USER INTERFACES | 314 |

AUTOMATICALLY FACILITATING TRAVEL ROUTES BASED UPON TRAVEL SCENARIOS

CROSS REFERENCE TO RELATED APPLICATION

This patent application perfects and claims priority benefit to U.S. Provisional Patent Application No. 63/000,765, filed Mar. 27, 2020, and entitled AUTOMATICALLY FACILITATING TRAVEL ROUTES BASED UPON TRAVEL SCENARIOS, which is hereby incorporated herein by reference in its entirety.

BACKGROUND

This invention relates, in general, to vehicle travel and in particular to automatically facilitating a travel route based upon at least one travel scenario.

Mobile objects include objects which are capable of movement such as vehicles (e.g., cars, trucks, buses and trolleys) or mobile devices, including cellular devices and wireless communication devices. Mobile objects such as buses or trucks may be used to provide services, such as delivering persons, products or other cargo. Also, such mobile objects are often used to travel particular travel routes. For example, vehicles may frequently travel routes in accordance with a desired schedule to pick up or discharge passengers or cargo. Generating optimum travel routes for vehicles or other mobile objects can be a difficult task. One challenge in facilitating a travel route is to generate the most optimal travel route based upon a travel scenario and/or different travel scenarios.

SUMMARY

Shortcomings of the prior art are overcome and additional advantages are provided through the provision of a method, computer system and/or computer program product for facilitating a vehicle travel route. In one aspect, a machine implemented method includes accessing, via at least one electronic device, a geographic map stored in at least one memory. One or more travel regions are optionally provided on the geographic map, but not altering the underlying structure of the map, the travel regions being designated as preferred, restricted or prohibited travel regions. One or more curb approach settings are provided on the geographic map, but not altering the underlying structure of the map, the curb approach settings representing travel preferences for travel on each direction of travel on a street segment. The curb approach settings are designated as no preference, restricted or prohibited travel for each of the opposite directions of the street segment. One or more maneuver settings are provided, on the geographic map, but not altering the underlying structure of the map, at one or more road junctions in the geographic map. The maneuver settings represent one or more possible directions of travel at the one or more road junctions. The maneuver settings are designated as no preference, restricted or prohibited maneuvers. A first set of at least one of the one or more travel regions, the one or more curb approach settings and the one or more maneuver settings are associated to a first travel scenario. The travel regions, curb approach settings and maneuver settings associated with the first travel scenario are displayed on the geographic map on at least one electronic device. A processor generates a travel route based upon the first travel scenario including its associated travel regions, curb approach settings and maneuver settings. The at least one electronic device displays the travel route for the vehicle to travel. Once saved, the travel scenario can be applied to previously existing or newly created travel routes.

The first travel scenario may be based upon, but is not limited to, one or more, time of day, time of year, traffic affecting events, and road construction. The at least one electronic device may include an electronic device within the vehicle. The method may include storing the first travel scenario in the at least one memory from which the geographic map is selected. The method may further include overriding at least one of a travel region, curb approach setting and/or maneuver setting associated with the first travel scenario; generating via a processor a modified travel route based upon the overriding step; and displaying the modified travel route for the vehicle to travel on the at least one electronic device. The overriding step may be performed by a vehicle operator or an administrator. The method may further include associating a second set of at least one of the one or more travel regions, the one or more curb approach settings and the one or more maneuver settings to a second travel scenario, the second set being different than the first set; displaying the travel regions, curb approach settings and maneuver settings associated with the second travel scenario on the geographic map on the at least one electronic device; a processor generates a travel route based upon the second travel scenario; and the at least one electronic device displays the travel route for the vehicle to travel.

In another aspect, a computer system for implementing a method for facilitating a vehicle travel route includes at least one memory. The computer system also includes one or more processors in communication with the at least one memory. The computer system is configured to perform the method.

In another aspect, a computer program product for implementing a method for facilitating a vehicle travel route includes a computer readable storage medium readable by a processing circuit and storing instructions for performing the method. Also, computer-implemented systems relating to one or more aspects and the method are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 11, depicts the components of the system shown in FIG. 10; and

DETAILED DESCRIPTION

Figure 1:
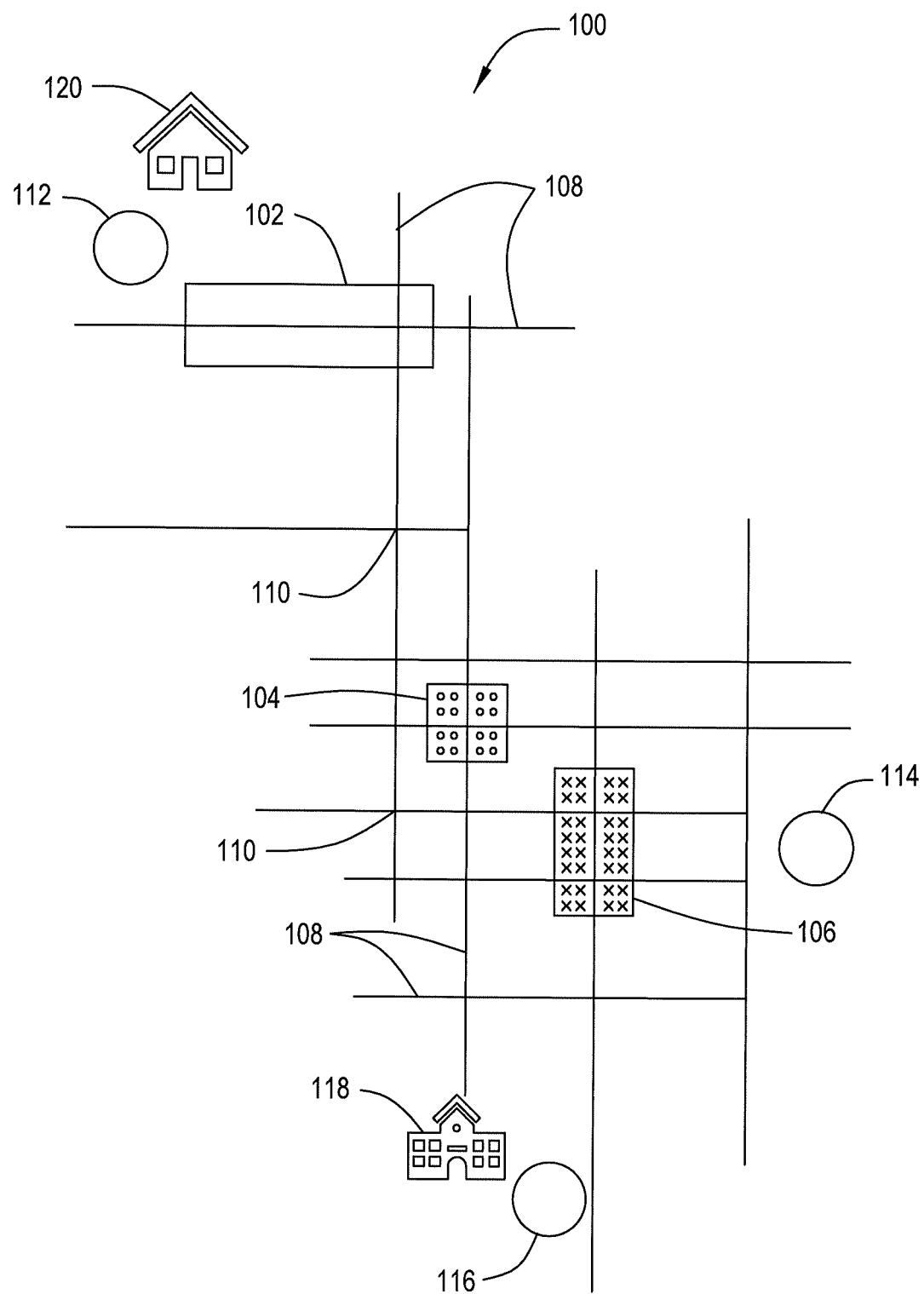
FIG. 1 depicts an example of a geographic map having travel regions provided on the map, in accordance with aspects described herein.

Certain examples will now be described to provide an overall understanding of the principles of the structure, function, manufacture, and use of the methods, systems, and devices disclosed herein. One or more examples are illustrated in the accompanying drawings. Those skilled in the art will understand that the methods, systems, and devices specifically described herein and illustrated in the accompanying drawings are non-limiting examples and that the scope of the present disclosure is defined solely by the claims. The features illustrated or described in connection with one example may be combined with the features of other examples. Such modifications and variations are intended to be included within the scope of the present disclosure.

The terms "substantially", "approximately", "about", "relatively," or other such similar terms that may be used throughout this disclosure, including the claims, are used to describe and account for small fluctuations, such as due to variations in processing from a reference or parameter. Such small fluctuations include a zero fluctuation from the reference or parameter as well. For example, they can refer to less than or equal to ±10%, such as less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

When following a travel route for objects or passengers, such as for students riding a school bus, there may be times when modifications are needed to maintain a travel route that is safe, efficient and includes all of the route's assigned stops, from point of departure through the route's final destination. For example, it is possible that additional stops or path segments may be added to a travel route to accommodate additional pickup or drop off requests for newly assigned objects or passengers. It is also possible that changing attributes, such as traffic patterns, weather, vehicular accidents or the like, may require a travel route to be modified "in real time" while still keeping the route safe, efficient and encompassing all previously planned stops.

A travel scenario includes an associated combination of travel regions, curb approach settings and/or maneuver settings that aide in determining a vehicle travel route within a geographic map. Travel regions represent travel preferences through regions within a map. Curb approach settings represent travel preferences of directions of travel on street segments within a map. Maneuver settings represent travel preferences of directions of travel at junctions (or intersections) of streets within a geographic map.

Aspects of the invention allow users to apply custom settings to maps that only affect wayfinding when that scenario is selected or active while generating a route and directions. A selected travel scenario does not permanently change the underlying map properties. When a travel scenario is created, by for example a software application in accordance with the invention, the application may use the map and attributes in the map but may not become part of the map. Rather the travel scenario may provide and display the travel regions, curb approach settings and/or maneuver settings on the map, but not within the map. The travel scenario may be, for example, a map layer that is disposed on top of the base map layer, which uses the map for reference, but does not alter the map.

Multiple travel scenarios may be created for use with the same map, each with unique settings. Aspects of the invention may be included as an optional attribute that can be applied to a route or trip planning program. Travel scenarios may correspond to travel situations or conditions, for example, daytime travel, nighttime travel or other time of day travel, dry weather, wet or snowy weather or other weather conditions, heavy traffic, light traffic or other traffic conditions, seasonal travel such as summer or winter travel, school being in session or not in session, road width, maximum weight allowance, visibility, and whether certain streets are traversable by certain vehicles.

In one aspect, a travel scenario may be changed at any time. Once changed, the travel route will be re-evaluated based on the settings associated with the newly applied travel scenario, while allowing the vehicle to arrive at the travel route's stops. This can aide in situation-based routing using local knowledge of traffic patterns at different times of the day, with changes in weather, the individuals being transported, or the vehicle in use. For example, a first travel scenario may be for travel during dry weather and a second travel scenario may be for travel during wet weather. A user may select a first travel scenario based upon dry weather and then, if the weather turns wet, change to the second travel scenario. When this occurs, the system will add the settings associated with the second travel scenario and change the travel route accordingly.

In one or more aspects, a capability is provided for automatically generating a travel route for a mobile object during one or more travel scenarios based upon travel regions, curb approach settings and/or maneuver settings. The travel route is generated automatically via a computer system. Mobile objects may include mobile devices, such as wireless communication devices (e.g., smart phones) and/or vehicles such as trucks, buses including school buses, cars and trolleys.

In addition to the system being used to facilitate travel routes in real time, the system may be used to facilitate travel routes prior to travel and/or based upon historical travel and GPS data for mobile objects. Travel routes include routes designated to be travelled by a mobile object. Such travel routes include automobile routes, bus routes, truck routes, and/or trolley routes. Common examples of planned travel routes include city bus public transportation routes and school bus routes.

In other aspects, when a geographic map is first opened by a software application in accordance with the invention, the application may identify existing attributes of the map and automatically generate one or more curb approach settings and one or more maneuver settings based on those underlying map attributes. The application may then create a default travel scenario based on the generated curb approach settings and maneuver settings and display the default travel scenario on the map. The default travel scenario would make no changes to the underlying attributes of the map. Optionally, the application may generate one or more travel regions when the geographic map is first opened. If no travel region is generated when the map is first open, then the default travel scenario would not include a travel region.

A user does not have to make a change to the default settings to save them as a travel scenario. Additionally, a user can create or edit a travel region or a curb approach setting or a maneuver setting and save it as a new travel scenario An algorithm of the application may designate the curb approach settings and maneuver settings of a travel scenario as: "no preference", "restricted" or "prohibited." A designation of no preference for a curb approach setting would indicate that there would be no difference in cost of efficiency for either direction of travel available to a vehicle on a street segment and either direction is permitted. A designation of no preference for a maneuver setting would indicate that there would be no difference in cost of efficiency for either direction of turn available to a vehicle at a street junction and either turn is permitted. A designation of restricted for either a curb approach setting or maneuver setting would indicate that it would be a costlier option for the vehicle to take than the other curb approaches or maneuvers available to the vehicle. A designation of prohibited would indicate that the vehicle's path may not traverse the prohibited curb approach or maneuver at all. Cost of efficiency in this case means cost in terms of time required for a vehicle to traverse a travel route.

An algorithm of the application may designate the travel regions of a travel scenario as: "preferred", "restricted" or "prohibited." Designations of restricted or prohibited for a travel region are the same as they are for a curb approach setting or a maneuver setting. That is, a restricted travel region indicates that it would be a costlier option for a vehicle to traverse the travel region, and a prohibited travel region indicates that a vehicle may not traverse the travel region. However, a designation of "preferred" for a travel region is different than a designation of "no preference" for either a curb approach setting or a maneuver setting. That is, a preferred travel region would indicate that traversing a street in the preferred travel region is less costly, and therefore more advantageous, than traversing through alternative paths.

A user, who wishes to create a trip, may be prompted to input additional attributes or change existing attributes on the map, which create additional non-default travel regions, curb approach settings, maneuver settings and travel scenarios. Alternatively, the user may choose not to input any additional attributes and just use the default travel scenario.

The user may also be prompted to choose from one or more travel scenarios previously stored in memory, which would include at least the default travel scenario. The application may then associate the chosen travel scenario to the map. Alternatively, the user may be prompted to select a travel route to which a travel scenario may be automatically applied.

Further details regarding generating a travel route for a mobile object are described with reference to the following figures. Aspects of this system or processes may be performed by a computer system including one or more processors in the mobile object, by one or more processors remote to the mobile object, or by a combination of processors in the mobile object and remote to the mobile object. Many possibilities exist.

Referring to FIG. 1, an example of a geographic map 100 having travel regions 102, 104, 106 provided using, and displayed on map 100 is depicted in accordance with aspects described herein. The map 100 may include streets, comprised of street segments 108 and junctions 110 (i.e., locations where two or more streets interconnect or cross). Additionally, the map 100 may include other features such as vehicle stops 112, 114, 116 schools 118, homes 120, or other objects located within the boundaries of the map 100. The various features on the map may be associated with locational coordinates (such as GPS and/or other X-Y coordinates) that define the feature's position on the map 100.

The geographic map 100 may be stored in at least one memory of at least one electronic device. The electronic device may be a mobile object, such as in a vehicle. Alternatively, the electronic device may be an electronic device within a vehicle (such as a cell phone used by the driver of a vehicle). Further, the electronic device may not be a mobile object or may not be located in a vehicle. Rather the electronic device may, for example, be a stationary main-frame computer, a personal computer, a lap-top, a tablet or a server located anywhere. The map 100 may be provided by software associated with the electronic device and displayed on a user interface associated with the electronic device.

The software associated with the electronic device may enable a user to interact with the map 100. Attributes about, for example, the streets and street segments, X-Y coordinates, and areas on the map may be associated to one or more travel scenarios. Within a travel scenario, attributes may be modified so that vehicle travel routes (as indicated by directional arrows 122 of FIG. 4) created to and from points of departure, stops (planned and unplanned) and destinations follow rules and preferences required for efficient transportation of objects and/or passengers.

A user may create any number of travel regions (such as travel regions 102, 104, 106) by, for example, drawing shapes or boundaries on the map 100. Each of the travel regions 102, 104, 106 created using the geographic map, may be designated as preferred, restricted or prohibited travel regions. All features (such as streets 108 and intersections 110) whose X-Y coordinates fall within the boundaries of a travel region will be associated with that region's designation.

Preferred travel regions (such as travel region 102) are areas that should be used before other possible options for travel route creation or travel. Restricted travel regions (such as travel regions 106) are areas that should be avoided. Prohibited travel regions are areas that may never be used for travel route creation.

The determination of whether or not a travel region is designated as "restricted" may be calculated on a weighted scale. For example, if a travel region is restricted, any street segments that fall within the region may be weighted by a routing algorithm and become a costlier option in terms of efficiency for a vehicle to traverse. The routing algorithm may attempt to modify the travel route of the vehicle using different streets outside of the restricted travel region. If the modified travel route requires travelling a different set of streets but has equal or less efficiency cost than travelling through the restricted region, the modified travel route will be used. If there is no alternate travel route that still allows the vehicle to get to the destination in an equal or less costly way, the travel route will route the vehicle through the restricted travel region. As will be discussed in greater detail in FIG. 2 with respect to curb approach settings and in FIG. 3 with respect to maneuver settings, restricted curb approaches and restricted maneuver settings may also be calculated on a weighted scale and may be evaluated in a similar fashion as that of restricted travel regions.

Prior art methods of determining a travel route have been generally limited to travel regions that are designated as preferred or prohibited. However, such generalized designations of travel regions do not take into consideration restricted travel regions, wherein the restricted travel region may be traversed if, for example, other alternatives routes are less efficient. Utilizing at least three types of preference designations (e.g., preferred, restricted and prohibited) for travel regions may provide improved levels of efficiency over the prior art when determining a travel route. Additionally, the resulting optimized travel route may take less time to traverse than prior art methods utilizing only preferred and prohibited designations for travel regions. Moreover, prior art methods do not disclose the combination of preferred, restricted and prohibited designations, which may be applied to travel regions, or no preference, restricted, and prohibited which may be applied to curb approach settings and maneuver settings. As such the present invention includes technical and other improvements, which may generate improved travel routes that are faster to traverse and are more efficient than travel routes determined with prior art methods.

Each of the preferred, restricted and prohibited travel regions may be displayed with a unique visual indicator to identify their designation to a user. For example, the preferred travel regions 102 may be displayed in green, white or no color, the restricted travel regions 106 may be displayed in yellow or be crosshatched or include a plurality of X's, and the prohibited travel regions 104 may be displayed in red or be dotted.

Figure 2:
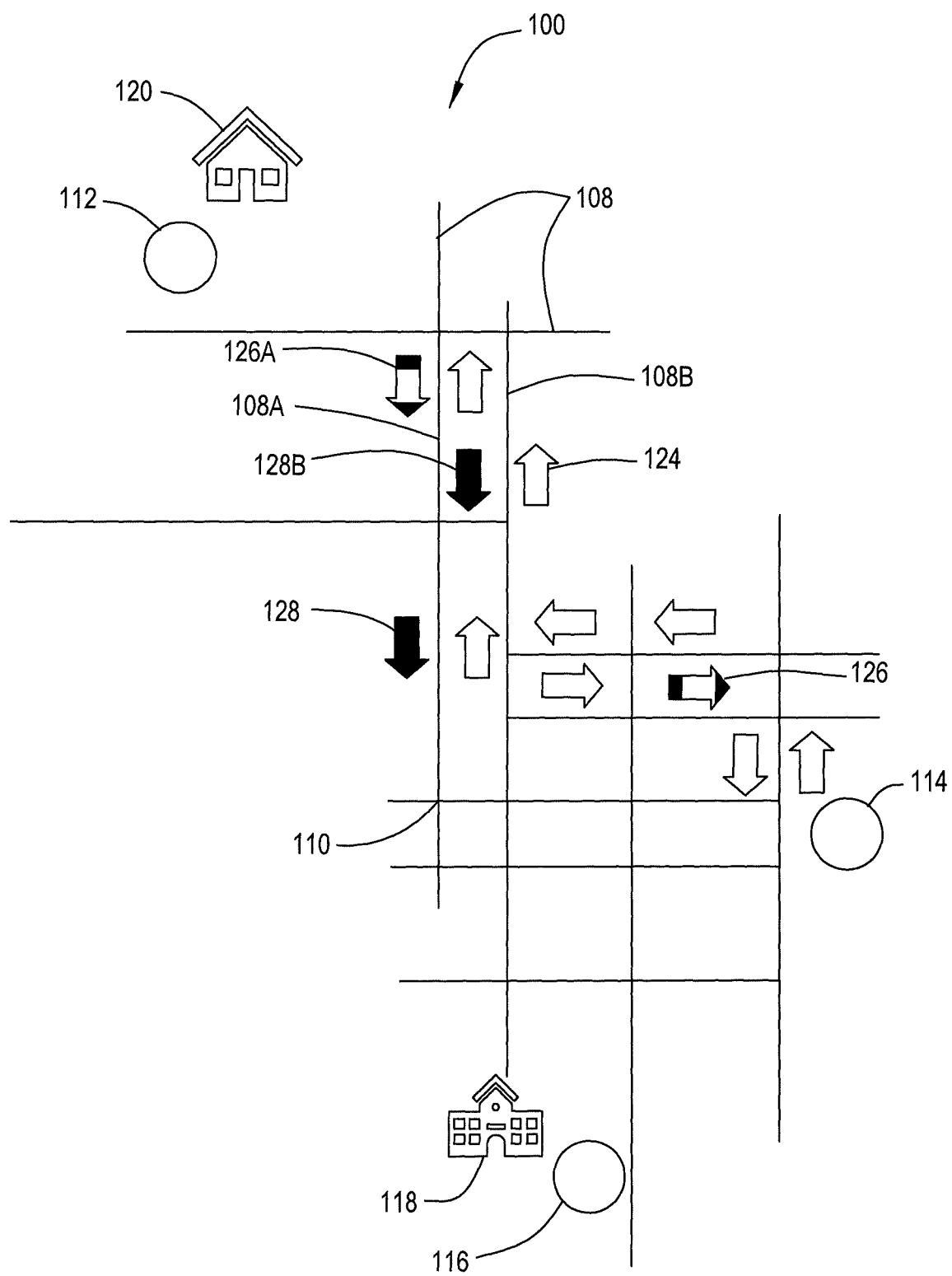
FIG. 2 depicts an example of the geographic map of FIG. 1 having curb approach settings provided on the map, in accordance with aspects described herein.

Referring to FIG. 2, an example of the geographic map 100 having curb approach settings 124, 126, 128 provided using the map 100 is depicted in accordance with aspects described herein. The curb approach settings (as indicated by directional arrows 124, 126, 128) represent travel preferences for travel on each direction of travel on a street segment 108. The curb approach settings may be designated as no preference 124, restricted 126 or prohibited 128 travel for each of the opposite directions of the street segment.

The determination of whether a curb approach setting is designated as "restricted" may be calculated on a weighted scale by a routing algorithm in accordance with the invention. For example, if a curb approach is restricted, it may be calculated and weighted by a routing algorithm to be a costlier option for the vehicle to take than other available curb approach settings. The routing algorithm may attempt to modify the travel route using a different curb approach. If the modified travel route using an alternate curb approach, requires travelling a different set of streets, but has equal or less efficiency cost than travelling through the restricted curb approach, the modified travel route will be used. If there is no alternative travel route that still allows the vehicle to get to the destination in an equal or less costly way, the vehicle will use the restricted curb approach.

Each of the no preference, restricted and prohibited curb approach settings may be displayed with a unique visual indicator to identify their designation to a user. For example, the no preference curb approach settings 124 may be displayed in directional arrows that are colored green, white or no color, the restricted curb approach setting 126 may be displayed in directional arrows that are colored yellow or be crosshatched or be partially black and partially white, and the prohibited curb approach settings 128 may be displayed in directional arrows that are colored red or be dotted or be completely black.

Figure 4:
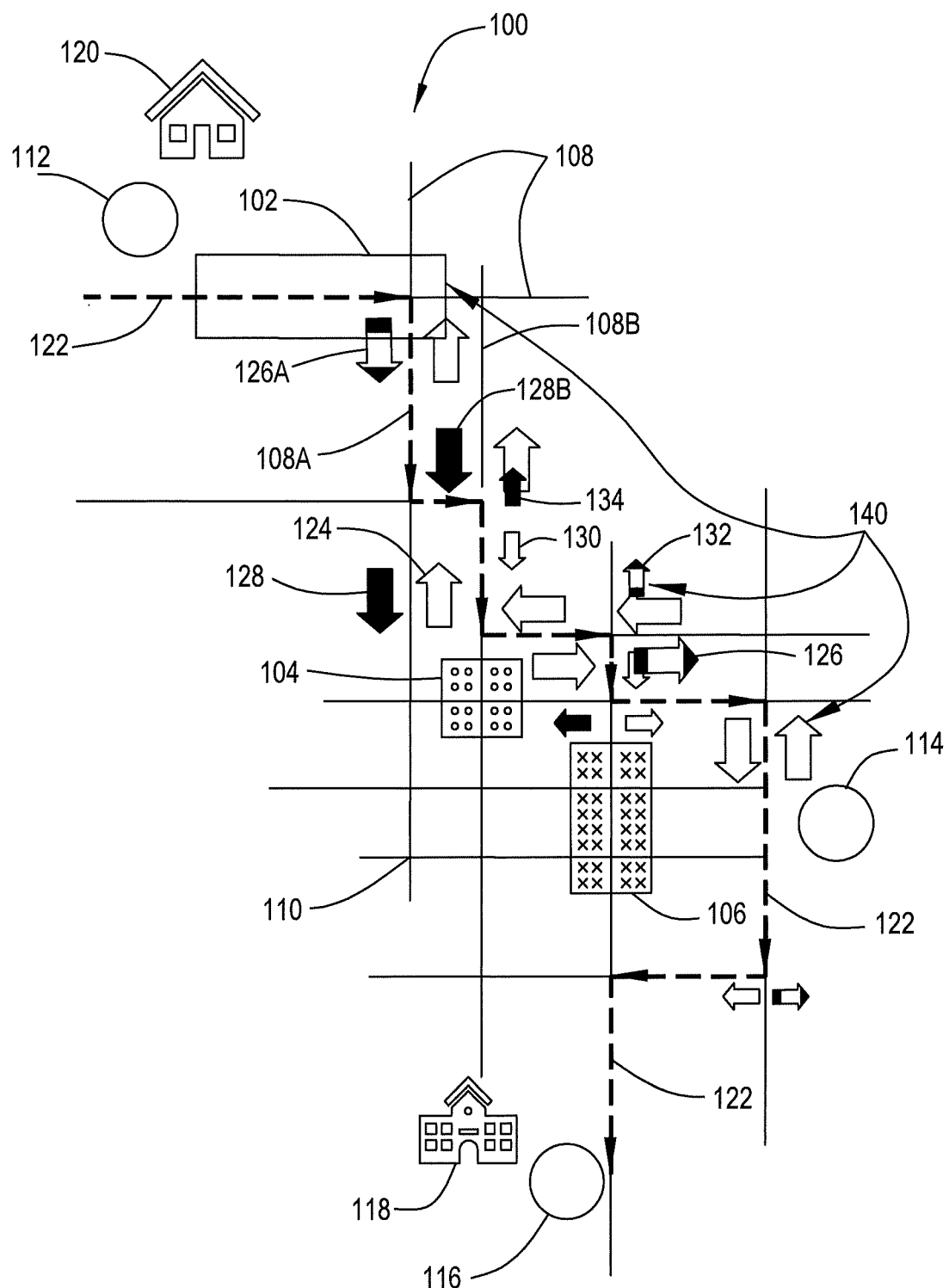
FIG. 4 depicts an example of the geographic map having a first travel scenario displayed within the map, in accordance with aspects described herein.

No preference curb approach settings (such as curb approach settings 124) may be designated for travel directions on street segments that can be used in either direction or on either side for a travel route (such as travel route 122 in FIG. 4). Restricted curb approach settings (such as curb approach settings 126) may be designated for travel directions on street segments that will restrict travel on the side indicated. Prohibited curb approach settings (such as curb approach settings 128) are street segments that will prohibit travel on the side indicated. No preference, restricted or prohibited curb approach settings may be set for one or both sides of a street segment.

The curb approach settings may be adjusted by a user through a user interface associated with the electronic device. For example, initially, all curb approaches settings 124, 126, 128 on the map 100 may be set at no preference and all curb approach directional arrows 124, 126, 128 may be colored white. Thereafter, clicking once on a directional arrow 126 may change the setting to restricted and change the color of the directional arrows 126 to yellow. Clicking twice on a directional arrow 128 may change the setting to prohibited and change the color of the directional arrows 128 to red.

If a travel route is created from points of departure 112, stops 114 (planned or unplanned) and to destinations 116, calculations will generate the most efficient route and may traverse a street segment 108 with no preference 124 going in either direction if the street segment is a two-way street. The travel route may also traverse a restricted street segment 126 if the weighted calculations indicate that it would be the most efficient direction to take. The travel route may never traverse a prohibited street segment 128.

By way of example in FIG. 2, a travel route may traverse down street segment 108A even though it is designated a restricted street segment direction by curb approach setting 126A. This is because, the only other alternative, would be to traverse down street segment 108B, which is designated a prohibited street segment direction by curb approach setting 128B.

Figure 3:
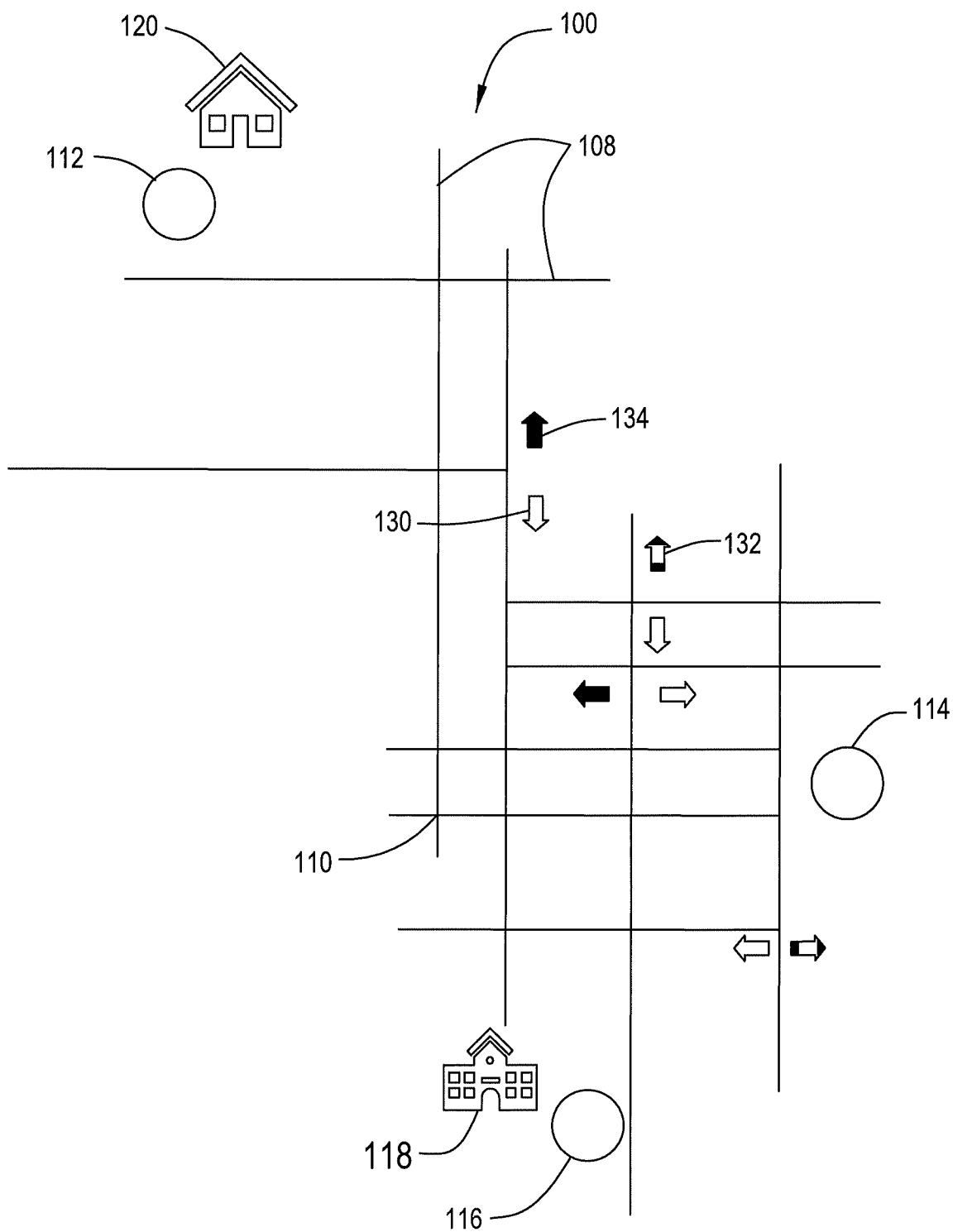
FIG. 3 depicts an example of the geographic map having maneuver settings provided on the map, in accordance with aspects described herein.

Referring to FIG. 3, an example of the geographic map 100 having maneuver settings 130, 132, 134 provided using and displaying on the map 100 is depicted in accordance with aspects described herein. The maneuver settings (as indicated by directional arrows 130, 132, 134) represent one or more possible directions of travel at the one or more road junctions (or intersections) 110. The maneuver settings may be designated as no preference 130, restricted 132 or prohibited 134 maneuvers.

Determination of whether or not a maneuver setting is designated as "restricted" may be calculated on a weighted scale. For example, if a maneuver setting is restricted, it may be calculated and weighted by a routing algorithm to be a costlier option for the vehicle to take than other available maneuver settings. The routing algorithm may attempt to modify the travel route using a different maneuver setting. If the modified travel route using alternate maneuver settings, requires travelling a different set of streets, but has equal or less cost than travelling through the restricted maneuver, the modified travel route will be used. If there is no modified travel route that still allows the vehicle to get to the destination in an equal or less costly way, the path will use the restricted maneuver.

Each of the no preference, restricted and prohibited maneuver settings may be displayed with a unique visual indicator to identify their designation to a user. For example, the no preference maneuver settings 130 may be displayed in directional arrows that are colored green, white or no color, the restricted maneuver settings 132 may be displayed in directional arrows that are colored yellow or are crosshatched or be partially black and partially white, and the prohibited maneuver settings 134 may be displayed in directional arrows that are colored red or are dotted or are completely black.

No preference maneuver settings (such as directional arrows 130) are junctions where travel may turn in any direction to calculate the travel route from points of departure 112, to stops 114 (planned or unplanned), and to destinations 116. No preference maneuver settings may be set for all possible directions for a junction 110. In the instance of a one-way street, maneuver settings will only allow for turning onto the street in the allowed direction of travel.

Restricted maneuver settings (such as directional arrows 132) are junctions where travel should not turn in the indicated direction. When calculating the travel route from points of departure 112, to stops 114 (planned or unplanned), and to destinations 116, the software may avoid using the restricted maneuver settings. Restricted maneuver settings may be set for all possible directions for a junction 110.

Prohibited maneuver settings (such as directional arrows 134) are junctions where travel may never turn in the indicated direction. When calculating the travel route from points of departure 112, to stops 114 (planned or unplanned), and to destinations 116, the software will never use the prohibited maneuver setting turn. Prohibited maneuver settings may be set for all possible directions for a junction 110.

The maneuver settings may be adjusted by a user through a user interface associated with an electronic device. For example, initially, all maneuver settings 130, 132, 134 on the map 100 may be set at no preference and all maneuver setting directional arrows 130, 132, 134 may be colored white. Thereafter, clicking once on a directional arrow 132 may change the setting to restricted and change the color of the directional arrows 132 to yellow. Clicking twice on a directional arrow 134 may change the setting to prohibited and change the color of the directional arrows 134 to red.

When a travel route is created, calculations will use the most efficient route and may turn (or maneuver) at a junction 110 with no preference 130 going in any direction. A travel route may also turn in a restricted direction 132 if the weighted calculations indicate that it would be the most efficient maneuver to take. The travel route may never maneuver in a prohibited direction 134.

Referring to FIG. 4, an example of the geographic map 100 displaying a travel route of a first travel scenario 140 displayed within the map 100 is depicted in accordance with aspects described herein. Once one of the travel regions 102, 104, 106, the curb approach settings 124, 126, 128 or the maneuver settings 130, 132, 134 have been created (as shown in FIGS. 1-3) and associated to a travel scenario (such as, for example, first travel scenario 140 to be used for "dry weather" travel), a travel route may be created for the selected planned or unplanned stops including the initial departure and final destination locations.

In the example of FIG. 4, any created travels regions 102, 104, 106, curb approach settings 124, 126, 128 and maneuver settings 130, 132, 134 are associated with the first travel scenario 140 (e.g., "dry weather travel"). However, any number and combination of the features of travel regions, curb approach settings or maneuver settings may be associated with a travel scenario, provided the travel scenario includes at least one such feature.

The travel regions 102, 104, 106, curb approach settings 124, 126, 128 and maneuver settings 130, 132, 134 associated with the first travel scenario 140 may be displayed on the geographic map on the at least one electronic device. A processor associated with the electronic device may then generate a travel route 122 (as shown in FIG. 4) based upon the first travel scenario 140. The at least one electronic device may then display the travel route 122 for the vehicle to travel. One of such electronic devices may be located in the vehicle and other electronic devices may be located elsewhere. For example, other electronic devices may be located at the facility of a transportation administrator, and other electronic devices displaying the route may be used by customers, such as passengers or their families.

When a travel route 122 is created based on the first travel scenario 140 from points of departure 112, stops 114 (planned or unplanned) and to destinations 116, the processor will calculate the most efficient route based upon the aforementioned settings. In the example illustrated in FIG. 4, the calculated route 122 traverses through preferred travel region 102 and avoids restricted travel region 106 and prohibited travel region 104. Additionally, travel route 122 also traverses down street segment 108A even though it is designated a restricted street segment direction by directional arrow 126A. This is because, the only other alternative, would be to traverse down street segment 108B, which is designated a prohibited street segment direction by directional arrow 128B. Finally, travel route 122 takes only the no preference maneuvers 130 at each intersection 110 and avoids the restricted maneuvers 132 and prohibited maneuvers 134.

A travel scenario (such as the first travel scenario 140) and its features of travel regions 102, 104, 106, curb approach settings 124, 126, 128 and maneuver settings 130, 132, 134 may be based upon many attributes. For example, they may be based upon one or more attributes including, but not limited to, weather, time of day, time of year, traffic affecting events, fuel status and road construction. Once created, the first travel scenario 140 and its associated travel regions, curb approach settings and maneuver settings may be stored in the at least one memory (which also includes the geographic map 100). However, the travel scenario 140 may be stored in the at least one memory as a separate object from the geographic map 100.

Figure 5:
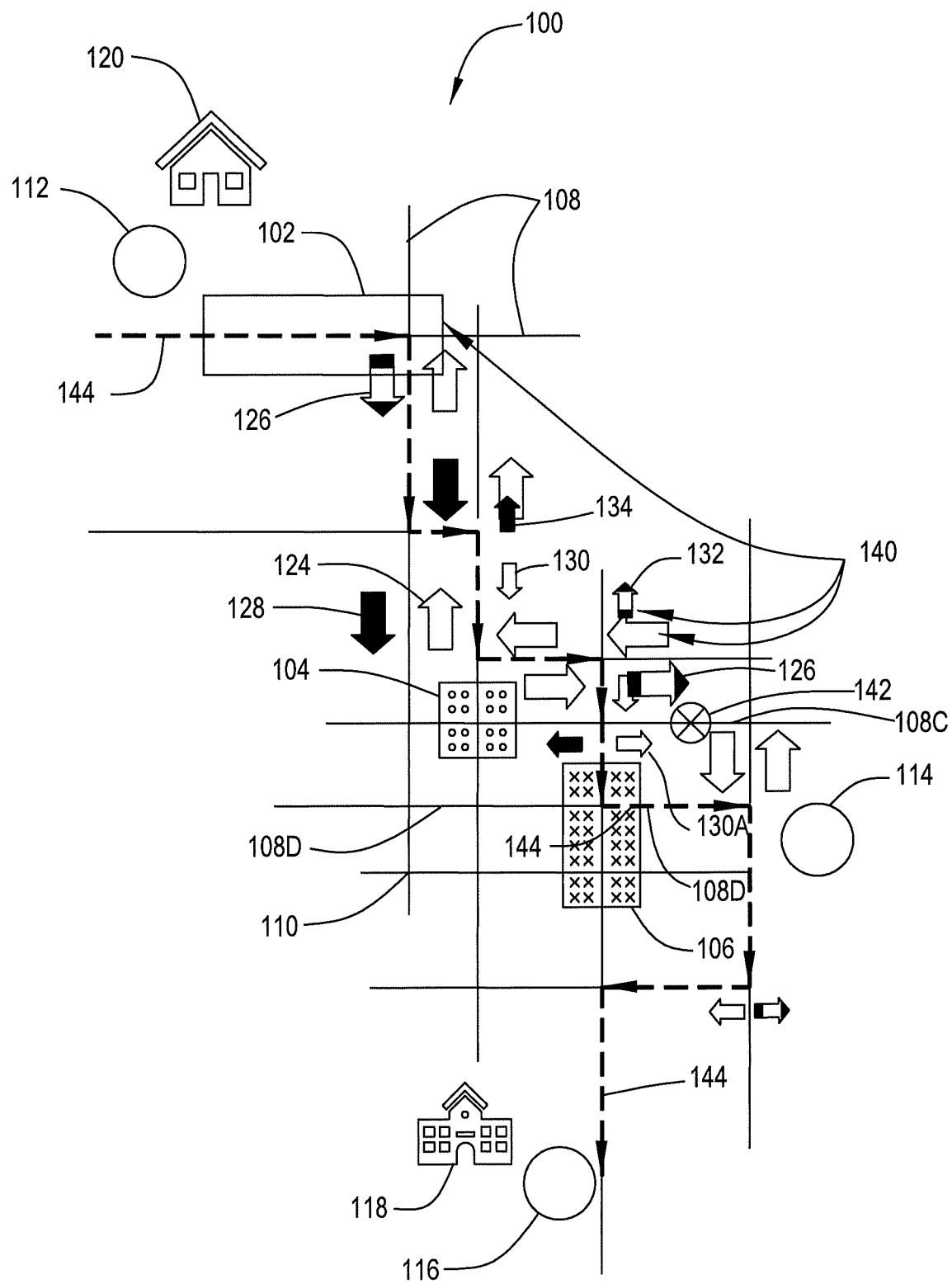
FIG. 5 depicts an example of the geographic map and the first travel scenario, wherein at least one of a travel region, curb approach setting and maneuver setting is overridden and a modified travel route is generated, in accordance with aspects described herein.

Referring to FIG. 5, an example of the geographic map 100 and the first travel scenario 140 is depicted, wherein at least one of a travel region, curb approach setting or maneuver setting is overridden and a modified travel route 144 is generated, in accordance with aspects described herein. If the attributes (such as weather, construction, vehicular accidents, or the like) that the first travel scenario 140 is based upon change, then at least one of the features of travel regions 102, 104, 106, curb approach settings 124, 126, 128 and maneuver settings 130, 132, 134 associated with the first travel scenario 140 may be overridden. Once overridden, a processor may generate a modified travel route (such as travel route 144) based upon the overriding of those features. The modified travel route 144 may then be displayed for the vehicle to travel on the at least one electronic device. The step of overriding may be performed by a vehicle operator or an administrator. The modified travel route 144 may not change the travel scenario 140 and the travel scenario 140 may still be used by other users and for other travel routes.

In the specific example of FIG. 5, a vehicular accident 142 has occurred on street 108C, making the maneuver setting 130A, which is designated as a no preference maneuver, prohibitive. Accordingly, once being notified of the accident, an administrator, or the operator of the vehicle traversing the route, may input into the electronic device a command to override maneuver 130A and effectively re-designate maneuver 130A as a prohibited maneuver. The software of the system will then generate a modified route 144. As illustrated in FIG. 5, the altered travel route 144 avoids street 108C by going through restricted travel region 106 and taking street 108D instead. Though the specific example illustrated in FIG. 5 overrides a maneuver setting 130A, any number or combination of travel regions, curb approach settings and/or maneuver settings may be overridden depending on changing conditions.

Figure 6:
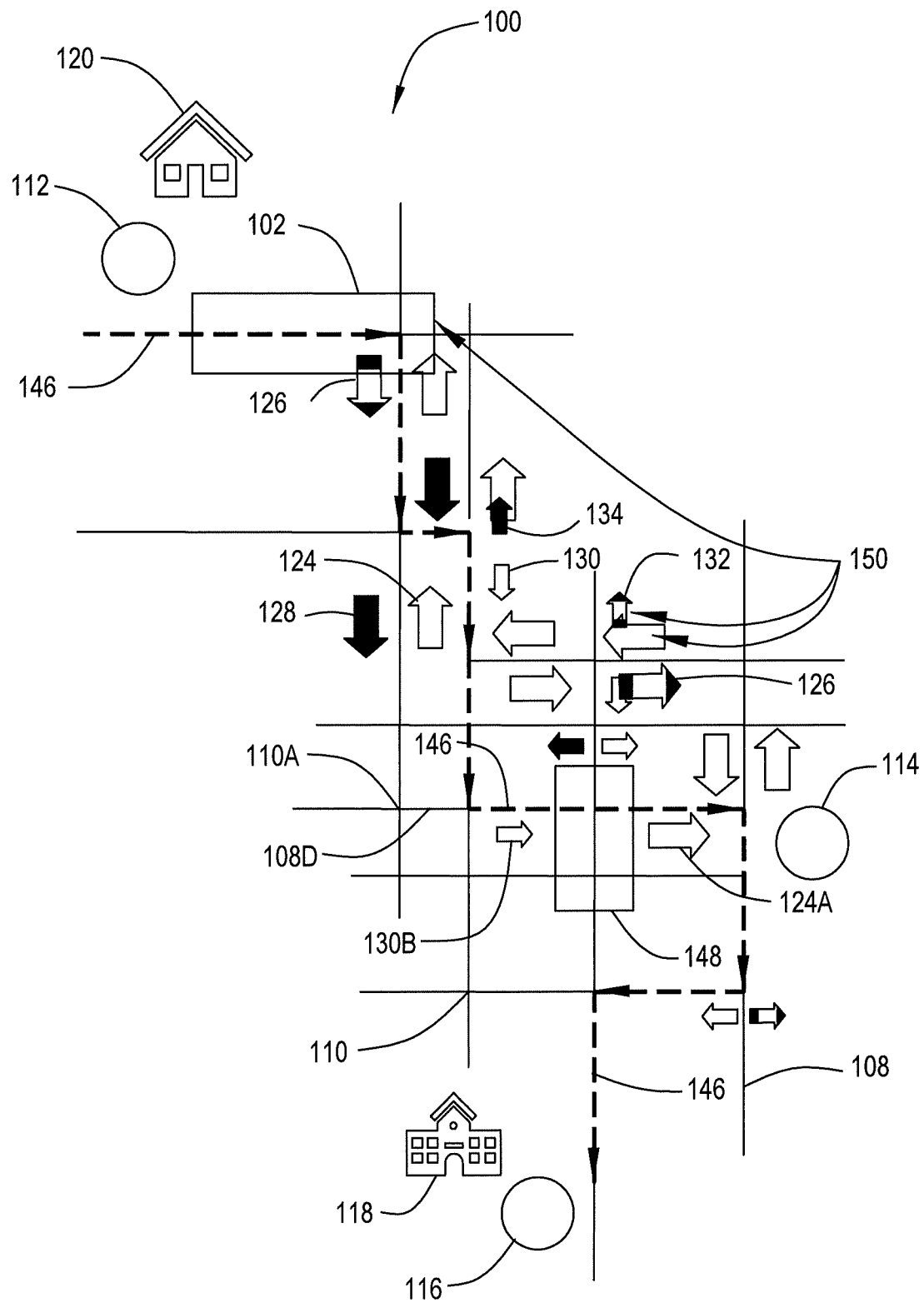
FIG. 6 depicts an example of the geographic map having a second travel scenario displayed within the map and wherein a new travel route is generated based on the second travel scenario, in accordance with aspects described herein.

Referring to FIG. 6, an example of the geographic map 100 having a second travel scenario 150 displayed on the map 100 is depicted in accordance with aspects described herein. As conditions (such as time of day, weather, construction and traffic) change, different travel scenarios may be selected in order to generate a more efficient travel route based on those changed conditions. So, for example the second travel scenario may be for "snowy weather" travel conditions.

Accordingly, a second set of one or more of the features of travel regions, the curb approach settings and the maneuver settings may be associated with a second travel scenario 150. The second set of features associated with the second travel scenario 150 may be different than the first set of features associated with the first travel scenario 140. For example, there may be travel regions which are restricted for snowy weather, as well as curb approach settings and/or maneuver settings. The second set of travel regions, curb approach settings and maneuver settings associated with the second travel scenario 150 may then be displayed on the geographic map 100 on the at least one electronic device. A processor associated with the electronic device may then generate a travel route 146 based upon the second travel scenario 150. The at least one electronic device may then display the travel route 146 on, for example, a display screen of a user interface, for the vehicle to travel.

In the example illustrated in FIG. 6, some of the features of travel regions, curb approach settings and maneuver settings are different for the second travel scenario. More specifically, with regards to the travel regions, the prohibited travel region 104 of FIG. 4 is not shown in the map 100 as it is not associated with the second travel scenario. Instead a preferred travel region 148 on the geographic map 100 is associated with the second travel scenario and displayed on the geographic map 100. Such a situation may occur, for example, when the first travel scenario is for "rush hour" or congested traffic conditions and the second travel scenario is for nighttime travel conditions. With regards to the curb approach settings, a different curb approach setting 124A designated for street segment 108D is associated with the second travel scenario as is maneuver setting 130B.

The travel route 146 generated based on the second travel scenario 150 now traverses through the area where prohibited region 104 of the first travel scenario used to be and performs the no preference left turn maneuver 130B onto street 108D. The travel route 146 then traverses up street segment 108D in the no preference curb approach direction 124A through the new preferred travel region 148 in order to reach its planned stop 114. For this example, from stop 114 to the final destination of 116, the travel route 146 is the same as the original travel route 140 generated using the first travel scenario. However, based upon the travel scenarios and their associated settings, a generated travel route for a particular travel scenario may be completely different than other travel routes, even when the trip starting points and ending points may be the same.

Figure 7:
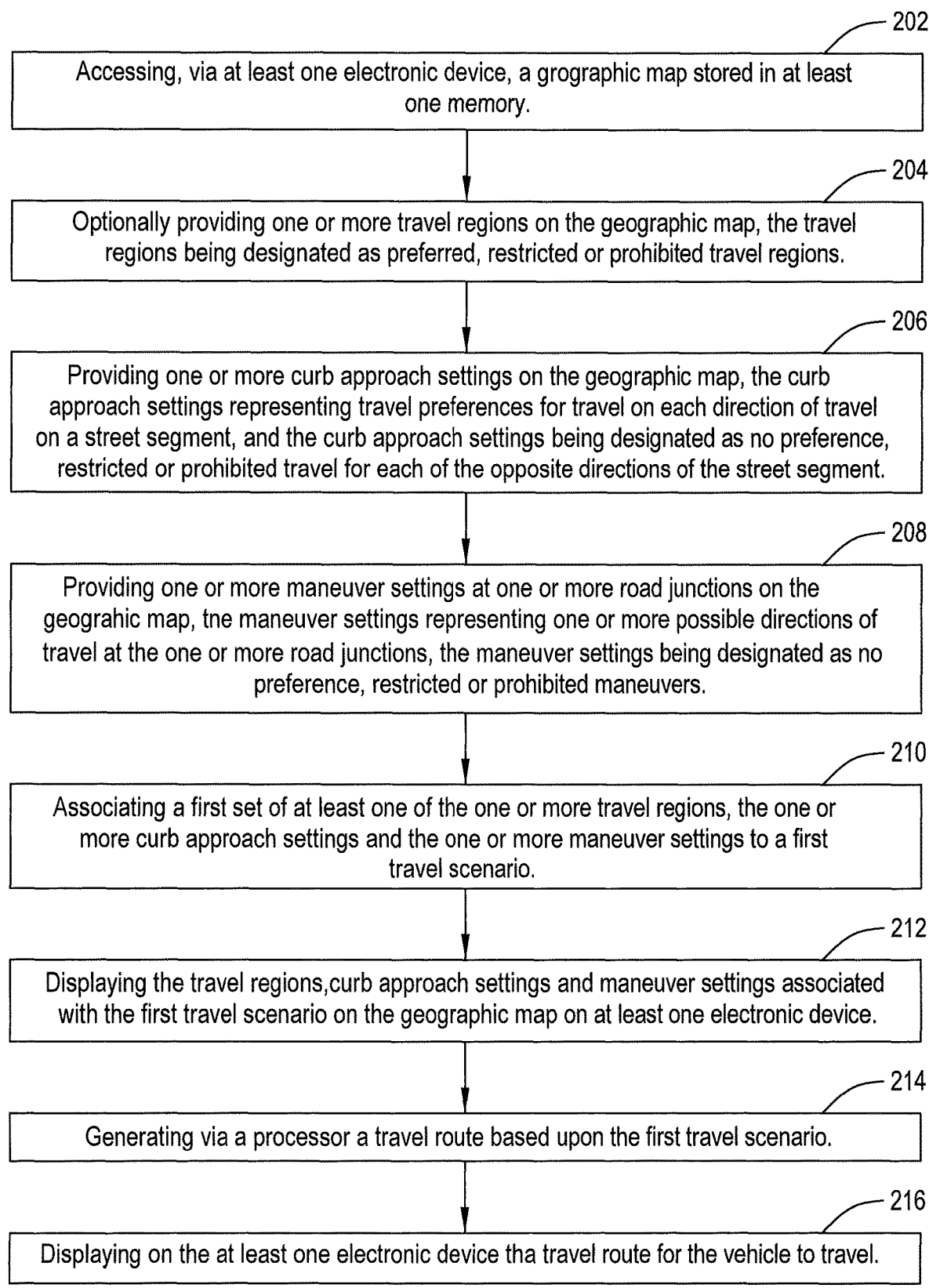
FIG. 7 depicts an example of a flow diagram of a method for facilitating a vehicle travel route, in accordance with aspects described herein.

Referring to FIG. 7, an example of a flow diagram of a method 200 for facilitating a vehicle travel route is depicted, in accordance with aspects described herein. The method 200 begins at 202 wherein an at least one electronic device accesses a geographic map 100 stored in at least one memory associated with the electronic device. The map 100 may include streets, comprised of street segments 108 and intersections 110. Additionally, the map 100 may include other features such as vehicle stops 112, 114, 116 schools 118 and homes 120.

At 204, the method optionally provides one or more travel regions 102, 104, 106 displayed on the geographic map 100. The travel regions represent travel preferences through regions (or areas) of the map 100. The travel regions may be designated as preferred, restricted or prohibited travel regions. The travel regions are associated and thus may be used with one or more travel scenarios. A software application in accordance with the invention may optionally provide one or more travel regions when a geographic map is first opened. If no travel region is generated when the map is first open, then the default travel scenario would not include a travel region.

At 206, one or more curb approach settings 124, 126, 128 are provided within the geographic map 100. The curb approach settings represent travel preferences for travel on each direction of travel on a street segment 108. The curb approach settings may be designated as no preference, restricted or prohibited travel for each of the opposite directions of the street segment. The curb approach settings are associated and thus may be used with one or more travel scenarios.

At 208, one or more maneuver settings 130, 132, 134 are provided at one or more road junctions (or intersections) 110 within the geographic map 100. The maneuver settings represent one or more possible directions of travel at the one or more road junctions. The maneuver settings may be designated as no preference, restricted or prohibited maneuvers. The maneuver settings are associated and thus may be used with one or more travel scenarios.

At 210 of the method, a first travel scenario 140 is associated with a first set of one or more of the travel regions 102, 104, 106, the curb approach settings 124, 126, 128 and the maneuver settings 130, 132, 134. The first travel scenario includes at least one of the features of travel regions, curb approach settings and/or maneuver settings and may be any combination of any number of those features.

At 212, the travel regions, curb approach settings and maneuver settings that are associated with the first travel scenario 140 are displayed on the geographic map on the at least one electronic device. At 212 of the method, a processor generates a travel route 122 that is based upon the first travel scenario 140. At 214, the travel route 122 is displayed on the at least one electronic device for the vehicle to travel.

Figure 8:
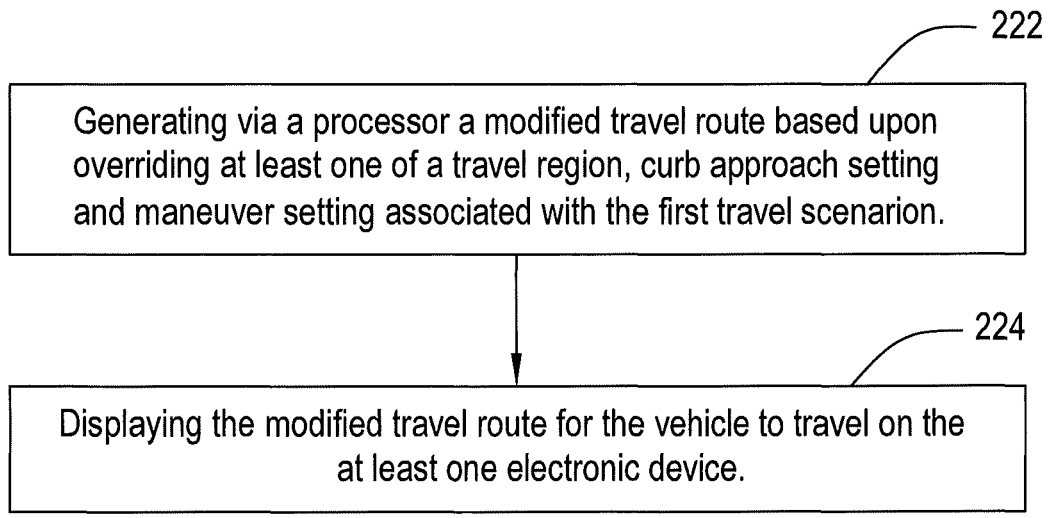
FIG. 8 depicts an example of a flow diagram for overriding at least one of a travel region, curb approach setting and maneuver setting associated with the first travel scenario of FIG. 4 to generate a modified travel route based on the overriding step, in accordance with aspects described herein.

Referring to FIG. 8, an example of a flow diagram of a method 220 for overriding at least one of the travel regions 102, 104, 104, curb approach settings 124, 126, 128 and maneuver settings 130, 132, 134 associated with the first travel scenario 140 of FIG. 7 to generate a modified travel route 144 based on the overriding step is depicted, in accordance with aspects described herein. This method 220 supplements the method 200 described in FIG. 7.

The method 220 begins at 222, wherein a processor, associated with the electronic device, generates a modified travel route 144 that is based upon overriding at least one of the travel regions 102, 104, 106 curb approach settings 124, 126, 128 and maneuver settings 130, 132, 134 associated with the first travel scenario 140. The overriding may be performed by a vehicle operator or an administrator. The overriding may also be performed in real time. For example, if the travel route shows a preferred maneuver onto a street of the geographic map, but the driver of a vehicle (such as a bus) sees that an accident has occurred that substantially blocks that street, then the driver may override that maneuver through a user interface associated with the electronic device. The driver may, for example, re-designate that maneuver as restricted, rather than preferred.

At 224, the modified travel route 144 for the vehicle to travel may be displayed on the at least one electronic device. The modified travel route 144 may not change the travel scenario 140 and the travel scenario 140 may still be used by other users and for other travel routes.

Figure 9:
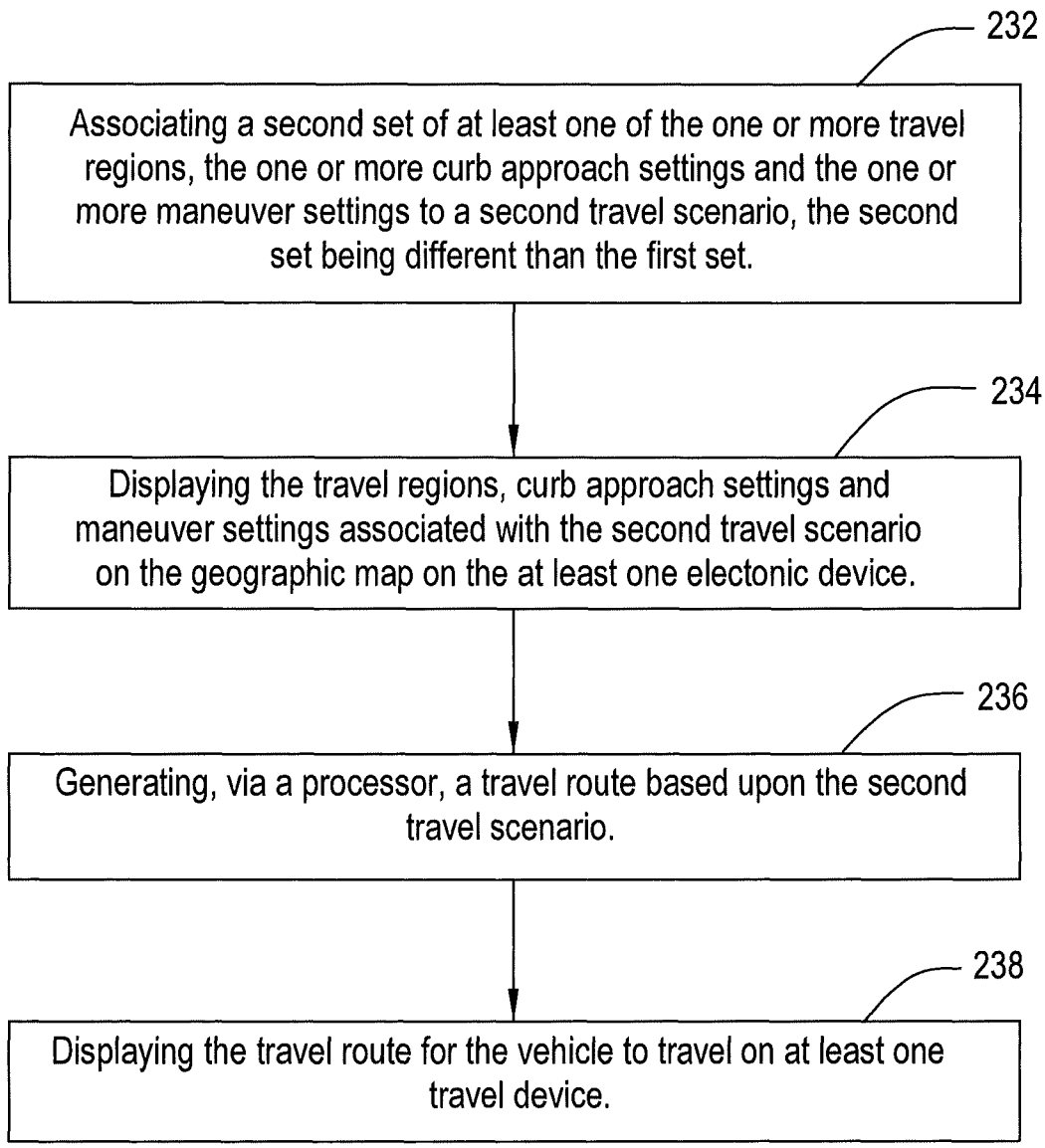
FIG. 9 depicts an example of a flow diagram for selecting a second travel scenario different from the first travel scenario of FIG. 4 in order to generate a new travel scenario, in accordance with aspects described herein.

Referring to FIG. 9, an example of a flow diagram of a method 230 for selecting a second travel scenario 150 that is different from a first travel scenario 140 in order to generate a travel route 146 based on the second travel scenario 150 is depicted, in accordance with aspects described herein. This method 230 supplements the method 200 described in FIG. 7.

The method 230 begins at 232, wherein a second set of one or more of the travel regions 102, 104, 106, curb approach settings 124, 126, 128 and maneuver settings 130, 132, 134 are associated with a second travel scenario 150. The second set associated to the second travel scenario 150 may be different than the first set associated to the first travel scenario 140. Based upon travel conditions, the second travel scenario 150 will be selected as a scenario for travel.

After the second travel scenario is selected, at 234, the travel regions, curb approach settings and maneuver settings associated with the second travel scenario may be displayed on the geographic map 100 on the at least one electronic device. At 236, a processor generates a travel route 146 based upon the second travel scenario 150. At 238 the travel route 146 for the vehicle to travel is displayed on the at least one travel device.

Figure 10:
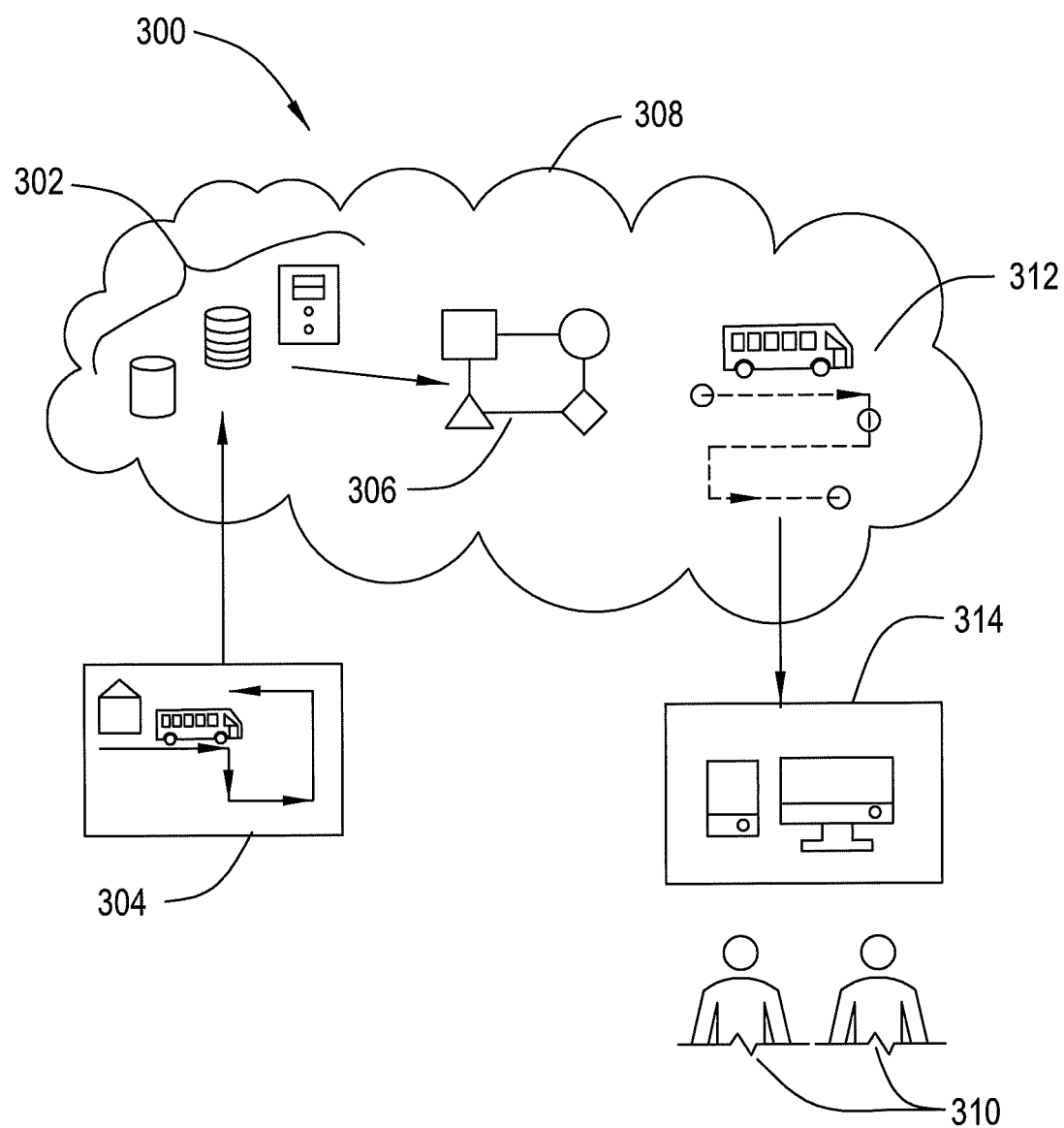
FIG. 10 depicts an example of a schematic representation of a system in accordance with aspects described herein.

Referring to FIGS. 10 and 11, aspects of a system 300 in accordance with an exemplary embodiment for facilitating a vehicle travel route is shown. The system 300 may include one or more processors or servers 302 where data (or information) 304 is transmitted and processes, including specific algorithms 306, are performed. In one example, the system 300 may be implemented via cloud computing 308. The system 300 receives or obtains information 304, which may represent an electronic map of an area. The information 304 may also include coordinates for each street, comprised of street segments, and intersections on the map and coordinates for each potential stop that the vehicle may stop at. The information 304 may also include input data on various attributes associated with the street segments, the intersections, the stops and any other objects or features on the map.

The system 300 also receives or obtains information 304 regarding travel scenarios, as well as the features of travel regions, curb approach settings and maneuver settings which make up travel scenarios. The information 304 may be input into the system 300 by users through a user interface 314. Such users may be, for example, travel administrators, vehicle operators, vehicle passengers or the like. The information may also be electronically transmitted to the system 300 via, for example, a global positioning system (GPS) or weather satellites.

The information 304 may include attributes associated with, or which affect, such features. For example, attributes such as size, shape, and location may be information related to travel regions. Also, by example, such attributes as one-way streets, traffic patterns, construction and time of day may be information related to curb approach settings and maneuver settings. The information 304 may also include whether the travel regions, curb approach settings and maneuver settings are designated preferred, restricted or prohibited. The system 300 is also operable to obtain updated or modified information 304 in real time regarding such travel scenarios, travel regions, curb approach settings or maneuver settings, such as, for example, a re-designation of a travel region from restricted to preferred.

The information 304 may be obtained by any viable method including receiving such information from a computer or mobile device or generating the same from GPS data that has been stored in one or more storage devices. The information may also be input by one or more users 310. Other techniques for obtaining information may also be used to create, generate, and/or obtain the same. Within the system 300 and memory associated therewith, the information 304 may be stored in any desirable format.

A process or algorithm 306 performed by the processor 302 may use the information 304 to generate results 312. The results 312 may electronically represent and/or generate a travel route based upon the selected travel scenario and one or more combinations of travel routes, curb approach settings and maneuver settings. The system 300 may also store the results 312 for later use or analysis.

Users (e.g., operators, administrators, vehicle drivers or the like) 310 may be enabled to view the results 312 on any number of user interfaces 314. The users 310 may also be allowed to input further information 304 through the user interfaces 314, to perform such tasks as modifying the process or algorithm 306 in order to edit or further analyze the results 312.

The generated route may be a system optimized route that takes into account first- and third-party traffic data, weather data, hazard data, and/or avoidance zone data. Additionally, the optimized route may be based on current data and/or historical data. In some embodiments, the generated routes may comprise a primary route and a plurality of alternate routes. The alternate routes may be prioritized based on total distance, total time, or total cost based on an objective cost function to complete each route.

When operating using real time data, the system may be used by users, such as transportation directors, who are responsible for generating travel routes for vehicles including a fleet of vehicles such as buses, school buses or trolleys, or delivery trucks, to optimize to travel routes. Once an optimized travel route has been determined, a user may authorize, or allow, certain vehicles to traverse the optimized travel route. Alternatively, the user may restrict or prohibit certain vehicles from traversing other travel routes.

Also, the system may be used by users of buses or trolleys, such as in public transportation routes. For example, when a mobile object such as a bus or trolley is assigned to travel from an initial starting destination to a final destination, the user may optimize the travel route based upon different travel scenarios. A mobile device may display the planned travel route for one or more vehicles as well as the vehicles which have been assigned (as described hereinabove) to the route.

In addition, when the system operates using historical travel or GPS data, users of the system may use the system to generate travel routes based upon historical data relating to the geographic area within which travel is desired and various travel scenarios. The system may store travel and GPS data as historical data during travel of a mobile object. In this regard, historical GPS data is accumulated over time and stored in the system or remotely. The historical GPS data can be used to perform data analytics of mobile objects and planned travel routes to determine travel regions, curb approaches and maneuver settings, during different travel scenarios.

One example of a computer system that includes processors that may be used by one or more aspects of the present invention is described with reference to FIG. 12. In this example, the computer system is part of a computing environment including additional components that may or may not be used by aspects of the present invention.

Figure 12:
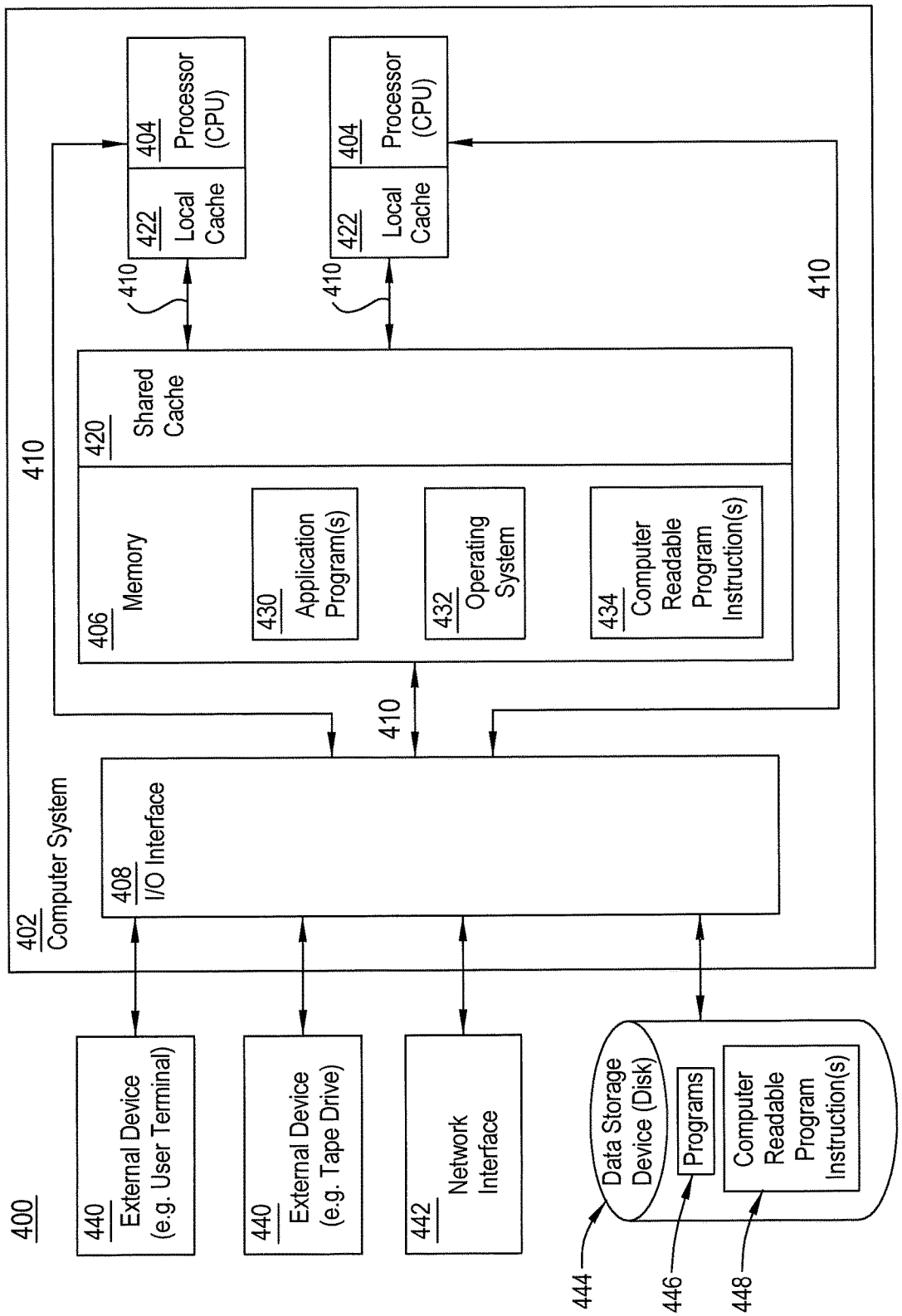
FIG. 12 depicts an example of a computing environment which may be used to incorporate and perform or more aspects of a method for facilitating a vehicle travel route, in accordance with aspects described herein.

As shown in FIG. 12, a computing environment 400 useable to perform the process of this invention is disclosed. The computing environment includes, for instance, a computer system 402 shown, e.g., in the form of a general-purpose computing device. Computer system 402 may include, but is not limited to, one or more processors or processing units 404 (e.g., central processing units (CPUs)), a memory 406 (a.k.a., system memory, main memory, main storage, central storage or storage, as examples), and one or more input/output (I/O) interfaces 408, coupled to one another via one or more buses and/or other connections 410.

Bus 410 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 406 may include, for instance, a cache 420, such as a shared cache, which may be coupled to local caches 422 of processors 404. Further, memory 406 may include one or more programs or applications 430, an operating system 432, and one or more computer readable program instructions 434. Computer readable program instructions 434 may be configured to carry out functions of embodiments of aspects of the invention.

Computer system 402 may also communicate via, e.g., I/O interfaces 408 with one or more external devices 440, one or more network interfaces 442, and/or one or more data storage devices 444. Example external devices include a user terminal, a tape drive, a pointing device, a display, etc. Network interface 442 enables computer system 402 to communicate with one or more networks, such as a local area network (LAN), a general wide area network (WAN), and/or a public network (e.g., the Internet), providing communication with other computer devices or systems. For example, the system may be connected to a personal computer, tablet device or smartphone to communicate the assigned or unassigned status of mobile objects to user via a graphical user interface.

Data storage device 444 may store one or more programs 446, one or more computer readable program instructions 448, and/or data, etc. The computer readable program instructions may be configured to carry out functions of embodiments of aspects of the invention.

Computer system 402 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 402. Examples, include, but are not limited to: microcode, device drivers, redundant processing units, external disk drive arrays, RAID systems, tape drives, and data archival storage systems, etc.

Computer system 402 may be operational with numerous other general purpose or special purpose computing system environments or configurations. Examples of well-known computing systems, environments, and/or configurations that may be suitable for use with computer system 402 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

One or more of the processors and/or other aspects of the computer system or computing environment may be remote from the mobile object. Further, in one particular example, a processor, such as processor 404, may execute, in accordance with one or more aspects of the present invention, one or more machine learning engines and/or other engines to provide, based on training and learning, an optimal travel route or path for mobile object. These engines may be stored in memory, including main memory and/or one or more caches, and/or external storage, and may be executed on one or more processors. Many variations exist.

One or more aspects of the present invention are inextricably tied to computer technology and/or to the improvement of a technical field.

One or more aspects may relate to cloud computing. It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages such as Angular, HTML, CSS, .NET Framework, C# and Microsoft SQL Server, and including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, different types of unmanned aerial vehicles may be used, as well as other types of neural networks and/or evolutionary algorithms. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

It should be appreciated that all combinations of the foregoing concepts and additional concepts discussed in greater detail herein (provided such concepts are not mutually inconsistent) are contemplated as being part of the inventive subject matter disclosed herein and to achieve the benefits and advantages as described herein. In particular, all combinations of claimed subject matter appearing at the end of this disclosure are contemplated as being part of the inventive subject matter disclosed herein.

Although the invention has been described by reference to specific examples, it should be understood that numerous changes may be made within the spirit and scope of the inventive concepts described. Accordingly, it is intended that the disclosure not be limited to the described examples, but that it has the full scope defined by the language of the following claims.

The invention claimed is:

1. A machine implemented method for facilitating a vehicle travel route comprising:
   accessing, via at least one electronic device, a geographic map stored in at least one memory;
   storing, in the at least one memory, data representative of one or more travel regions, each travel region representing travel preferences though an area on the geographic map comprising a plurality of street segments and a plurality of road junctions, each travel region being capable of being designated as one of a preferred, restricted and prohibited travel regions;
   storing, in the at least one memory, data representative of curb approach setting, each curb approach setting representing travel preferences for travel in each direction of travel on a street segment, and each curb approach setting being capable of being designated as one of no preference, restricted and prohibited travel for each of the opposite directions of the street segment;
   storing, in the at least one memory, data representative of one or more maneuver settings at one or more road junctions, each maneuver setting representing travel preferences for one or more possible directions of travel at a road junction of the one or more road junctions, each maneuver setting being capable of being designated as one of no preference, restricted and prohibited maneuvers;
   displaying on a user interface of the at least one electronic device, via an algorithm stored in the at least one memory, one or more of the travel regions on the geographic map, each travel region being designated as preferred, restricted or prohibited travel regions;
   displaying on the user interface, via the algorithm, one or more of the curb approach settings on the geographic map, each curb approach setting being designated as no preference, restricted or prohibited travel for each of the opposite directions of the street segment;
   displaying on the user interface, via the algorithm, one or more of the maneuver settings at one or more road junctions in the geographic map, each maneuver setting being designated as no preference, restricted or prohibited maneuvers;
   associating, via the algorithm, a first set of at least one of the one or more travel regions that have been designated as preferred, restricted or prohibited travel regions, the one or more curb approach settings that have been designated as no preference, restricted or prohibited curb approach settings and the one or more maneuver settings that have been designated as no preference, restricted or prohibited maneuver settings to a first travel scenario, the first travel scenario being stored in the at least one memory;
   displaying, via the algorithm, the travel regions, curb approach settings and maneuver settings associated with the first travel scenario on the geographic map on the user interface of the at least one electronic device;
   wherein a processor generates, via the algorithm, a most efficient travel route based upon the first travel scenario and attributes associated with the first travel scenario; and
   the at least one electronic device displays on the user interface, via the algorithm, the travel route for the vehicle to travel.

2. The method of claim 1, wherein the attributes associated with the selected first travel scenario comprise one or more of time of day, time of year, traffic affecting events, fuel status, vehicle size, vehicle weight, accidents, weather events and road construction.

3. The method of claim 1 further comprising storing the first travel scenario in the at least one memory from which the geographic map is selected.

4. The method of claim 1, wherein the at least one electronic device comprises an electronic device within the vehicle.

5. The method of claim 1 further comprising:
   overriding at least one of a travel region, curb approach setting and maneuver setting associated with the first travel scenario, the overriding based on real-time attributes associated with the first travel scenario;
   generating via a processor a modified travel route based upon the overriding step; and
   displaying on the user interface the modified travel route for the vehicle to travel on the at least one electronic device.

6. The method of claim 5, wherein the overriding step is performed by a vehicle operator or an administrator.

7. The method of claim 5, wherein the overriding comprises overriding a travel region.

8. The method of claim 1, comprising:
   associating a second set of at least one of the one or more travel regions, the one or more curb approach settings and the one or more maneuver settings to a second travel scenario, the second set being different than the first set;
   displaying the travel regions, curb approach settings and maneuver settings associated with the second travel scenario on the geographic map on the user interface of the at least one electronic device;

wherein a processor generates a most efficient travel route based upon the second travel scenario and attributes associated with the second travel scenario, and the at least one electronic device displays on the user interface the travel route for the vehicle to travel.

9. A computer system for facilitating a vehicle travel route comprising:

at least one memory; and one or more processors in communication with the at least one memory, wherein the computer system is configured to perform a method, the method comprising:

accessing, via at least one electronic device, a geographic map stored in at least one memory;

storing, in the at least one memory, data representative of one or more travel regions, each travel regions representing travel preferences through an area on the geographic map comprising a plurality of street segments and a plurality of road junctions, each travel regions being capable of being designated as one of preferred, restricted and prohibited travel regions;

storing, in the at least one memory, data representative of curb approach settings, each curb approach settings representing travel preferences for travel in each direction of travel on a street segment, and each curb approach settings being capable of being designated as one of no preference, restricted and prohibited travel for each of the opposite directions of the street segment;

storing, in the at least one memory, data representative of one or more maneuver settings at one or more road junctions, each maneuver settings representing travel preferences for one or more possible directions of travel at a road junction of the one or more road junctions, each maneuver setting being capable of being designated as one of no preference, restricted and prohibited maneuvers;

displaying on a user interface of the at least one electronic device, via an algorithm stored in the at least one memory, one or more of the travel regions on the geographic map, each travel regions being designated as preferred, restricted or prohibited travel regions;

displaying on the user interface, via the algorithm, one or more of the curb approach settings on the geographic map, each curb approach setting being designated as no preference, restricted or prohibited travel for each of the opposite directions of the street segment;

displaying on the user interface, via the algorithm, one or more of the maneuver settings at one or more road junctions on the geographic map, each maneuver settings being designated as no preference, restricted or prohibited maneuvers;

associating, via the algorithm, a first set of at least one of the one or more travel regions that have been designated preferred, restricted or prohibited travel regions, the one or more curb approach settings that have been designated no preference, restricted or prohibited curb approach settings and the one or more maneuver settings that have been designated no preference, restricted or prohibited maneuver settings to a first travel scenario, the travel scenario being stored in the at least one memory;

displaying, via the algorithm, the travel regions, curb approach settings and maneuver settings associated with the first travel scenario on the geographic map on the user interface of the at least one electronic device;

wherein the one or more processors generate, via the algorithm, a most efficient travel route based upon the first travel scenario and attributes associated with the first travel scenario, and the at least one electronic device displays on the user interface, via the algorithm, the travel route for the vehicle to travel.

10. The system of claim 9, wherein attributes associated with the selected first travel scenario comprise one or more of time of day, time of year, traffic affecting events, vehicle size, accidents, weather events and road construction.

11. The system of claim 9 wherein the method further comprises storing the first travel scenario in the at least one memory from which the geographic map is selected.

12. The system of claim 9, wherein the at least one electronic device comprises an electronic device within the vehicle.

13. The system of claim 9, wherein the method further comprises:

overriding at least one of a travel region, curb approach setting and maneuver setting associated with the first travel scenario, the overriding based on real-time attributes associated with the first travel scenario;

generating via a processor a modified travel route based upon the overriding step; and displaying the modified travel route for the vehicle to travel on the user interface of the at least one electronic device.

14. The system of claim 13, wherein the overriding step is performed by a vehicle operator or an administrator.

15. The system of claim 13, wherein the overriding comprises overriding a travel region.

16. The system of claim 9, wherein the method further comprises:

selecting a second travel scenario and associating a second set of one or more of the travel regions, the curb approach settings and the maneuver settings to the second travel scenario, the second set being different than the first set;

displaying the travel regions, curb approach settings and maneuver settings associated with the second travel scenario on the geographic map on the user interface of the at least one electronic device;

wherein a processor generates a most efficient travel route based upon the second travel scenario and attributes associated with the second travel scenario;

wherein the at least one electronic device displays on the user interface the travel route for the vehicle to travel.

17. A computer program product for facilitating a vehicle travel route, the computer program product comprising:

at least one computer readable storage medium readable by a processing circuit and storage instructions for performing a method comprising:

accessing, via at least one electronic device, a geographic map stored in at least one memory;

storing, in the at least one memory, data representative of one or more travel regions, each travel regions representing travel preferences through areas on the geographic map comprising a plurality of street segments and a plurality of road junctions, each travel regions being capable of being designated as one of preferred, restricted and prohibited travel regions;

storing, in the at least one memory, data representative of curb approach settings, each curb approach settings representing travel preferences for travel in each direction of travel on a street segment, each curb approach setting being capable of being designated as one of no preference, restricted and prohibited travel for each of the opposite directions of the street segment;

storing, in the at least one memory, data representative of one or more maneuver settings at one or more road junctions, each maneuver setting representing travel preferences for one or more possible directions of travel at a road junction of the one or more road junctions, each maneuver setting being capable of being designated as one of no preference, restricted and prohibited maneuvers;

displaying on a user interface of the at least one electronic device, via an algorithm stored in the at least one memory, one or more of the travel regions on the geographic map, each travel regions being designated as preferred, restricted or prohibited travel regions;

displaying on the user interface, via the algorithm, one or more of the curb approach settings on the geographic map, each curb approach setting being designated as no preference, restricted or prohibited travel for each of the opposite directions of the street segment;

displaying on the user interface, via the algorithm, one or more of the maneuver settings at one or more road junctions on the geographic map, each maneuver setting being designated as no preference, restricted or prohibited maneuvers;

associating, via the algorithm, a first set of at least one of the one or more travel regions that have been designated preferred, restricted or prohibited travel regions, the one or more curb approach settings that have been designated no preference, restricted or prohibited curb approach settings and the one or more maneuver settings that have been designated no preference, restricted or prohibited maneuver settings to a first travel scenario, the travel scenario being stored in the at least one memory;

displaying, via the algorithm, the travel regions, curb approach settings and maneuver settings associated with the first travel scenario on the geographic map on the user interface of the at least one electronic device;

wherein a processor generates, via the algorithm, a most efficient travel route based upon the first travel scenario and attributes associated with the first travel scenario, and the at least one electronic device displays on the user interface, via the algorithm, the travel route for the vehicle to travel.

18. The computer program product of claim 17, wherein the first travel scenario is based upon one or more of time of day, time of year, traffic affecting events, vehicle size, accidents, weather events and road construction.

19. The computer program product of claim 17, wherein the method further comprises storing the first travel scenario in the at least one memory from which the geographic map is selected.

20. The computer program product of claim 17, wherein the at least one electronic device comprises an electronic device within the vehicle.

21. The computer program product of claim 17, wherein the method further comprises:

overriding at least one of a travel region, curb approach setting and maneuver setting associated with the first travel scenario, the overriding based on real-time attributes associated with the first travel scenario;

generating via a processor a modified travel route based upon the overriding step; and displaying the modified travel route for the vehicle to travel on the user interface of the at least one electronic device.

22. The computer program product of claim 21, wherein the overriding comprises overriding a travel region.

23. The computer program product of claim 17, wherein the method further comprises:

associating a second set of at least one of the one or more travel regions, the one or more curb approach settings and the one or more maneuver settings to a second travel scenario, the second set being different than the first set;

displaying the travel regions, curb approach settings and maneuver settings associated with the second travel scenario on the geographic map on the user interface of the at least one electronic device;

wherein a processor generates a most efficient travel route based upon the second travel scenario and attributes associated with the second travel scenario and the at least one electronic device displays on the user interface the travel route for the vehicle to travel.

\* \* \* \* \*